J. A. GURKE.
BONNET CORNER PAD FOR AUTOMOBILES.
APPLICATION FILED MAY 28, 1921.

1,415,632.  Patented May 9, 1922.

INVENTOR:
John A. Gurke
by MacLeod, Calver, Copeland & Dike
Attys.

UNITED STATES PATENT OFFICE.

JOHN A. GURKE, OF DETROIT, MICHIGAN, ASSIGNOR TO ESSEX MOTORS, OF DETROIT, MICHIGAN, A CORPORATION OF MICHIGAN.

BONNET CORNER PAD FOR AUTOMOBILES.

1,415,632.      Specification of Letters Patent.      Patented May 9, 1922.

Application filed May 28, 1921. Serial No. 473,416.

*To all whom it may concern:*

Be it known that I, JOHN A. GURKE, a citizen of the United States, residing at Detroit, county of Wayne, State of Michigan, have invented a certain new and useful Improvement in Bonnet Corner Pads for Automobiles, of which the following is a specification, reference being had therein to the accompanying drawings.

My invention relates to means for protecting the lower corners of the panels or sides of the bonnet of an automobile so that they will not scratch the finely finished adjacent portions of the radiator or cowl, and also so that the bonnet will be kept from vibrating and rattling against adjacent parts. Heretofore, various expedients have been employed for this purpose; for instance, a corner pad formed of pieces of leather stitched together and riveted to the corner of the bonnet or a similar device made of felt has been used, but the leather itself, the stitching and the rivet have all scratched the varnish if the bonnet was moved carelessly and, therefore, these devices have been unsatisfactory. It has also been proposed to employ felt-protecting pieces, the same being secured to the bonnet by adhesive, but the use of such a device is subject to the difficulty of securing the felt permanently to the corner of the bonnet.

My present invention consists in supplying each corner of the bonnet with a ferrule or pad of soft rubber, felt or other suitable material which extends beyond the corner of the bonnet far enough to prevent the bonnet contacting with adjacent parts, the ferrule and the adjacent parts of the bonnet being interlocked so that the ferrule is secured to the bonnet without the use of rivets, adhesive or other independent means.

The device embodying my invention not only affords much more complete protection and prevents rattling and scratching, but in addition it can be constructed and the parts assembled at much less expense than similar devices heretofore commonly in use.

The invention will be fully understood from the following description when taken in connection with the accompanying drawings, and the novel features thereof will be pointed out and clearly defined in the claims at the close of this specification.

In the drawings, Fig. 1 is a side elevation of a portion of an automobile to the bonnet of which are applied bonnet corner pads embodying my invention.

Figure 1:
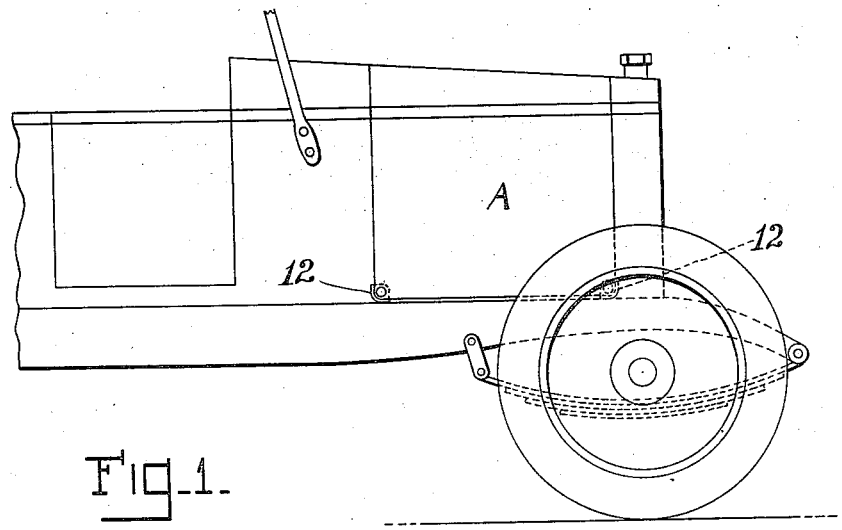
Figure 3:
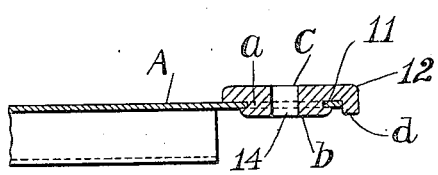
Figs. 2 and 3 are a side elevation and a sectional view of a portion of the corner of the bonnet shown in Figure 1.
Figure 2:
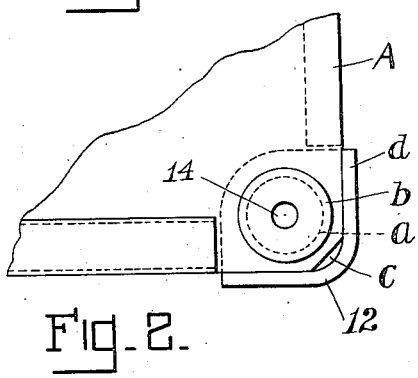

Referring now to the drawings, at A is shown one side panel of a bonnet of an automobile. The panel is conveniently referred to herein as the bonnet. The corner of the bonnet has a hole 11 of a size to receive the neck $a$ of a pad or ferrule 12 shown in Figure 4. This pad is made of soft rubber properly compounded and cured, or of felt or other suitable material which will have good resiliency and cushioning effect, and may be inserted in the hole 11 by being distorted. If preferred, the pad 12 may be molded into the position in which it is to be used, but will ordinarily be molded before being inserted. The pad 12 has on one side a head $b$ which is circular in shape and on the opposite side a head $c$ which in the form shown in Figure 3 extends beyond and along the adjacent edges of the bonnet A forming a lip $d$. At 14 is shown a central hole which renders the insertion of the pad easier. The pad and the bonnet are interlocked, the pad being inserted by forcing the head $b$ through the hole. It will of course be understood that I do not limit myself to the particular interlocking arrangement shown in Figures 2 and 3, since other interlocking arrangements of pad and bonnet are within the scope of my invention.

Figures 5, 6:
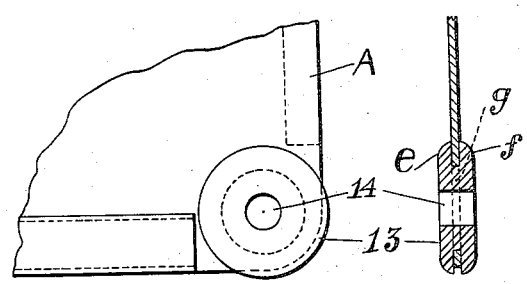
Figs. 5 and 6 are views showing the corners of a bonnet provided with pads embodying my invention in modified form.
Figures 4, 7, 8:
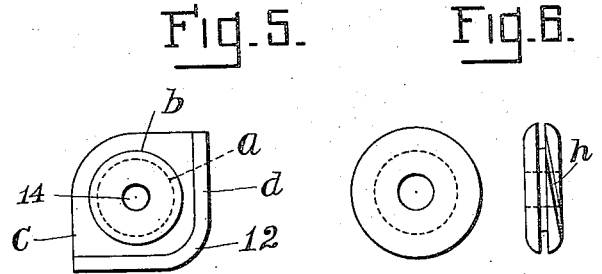
Fig. 4 shows the pad separate from the bonnet.
Figs. 7 and 8 are details showing still another form of pad.

In Figures 5 and 6, I have shown a pad 13 which has circular heads $e$ and $f$ respectively on both sides of the neck $g$. This pad is put in place in the same way as the one shown in Figures 2 and 3, or may be molded in place. Figures 7 and 8 show a pad similar to that shown in Figures 5 and 6, but in this case the pad is provided with a spiral slot $h$ somewhat on the principle of a screwthread so arranged that the pad can be twisted into the hole in the bonnet.

Figure 9:
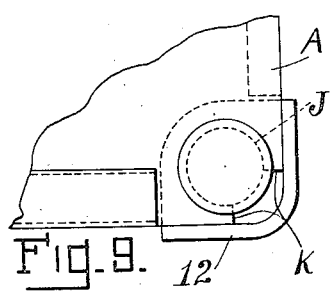
Fig. 9 shows a bonnet provided with a corner pad, the corner of the bonnet having an open slot to receive the ferrule.

In Figure 9 I have shown the bonnet A provided with a hole $j$ to receive the neck of the pad 12, the portion of the hole at the corner being cut away to produce an open slot $k$ through which the neck of the pad can be inserted.

What I claim is:—

1. In combination with a bonnet of an automobile, a protecting member formed of cushioning material, said bonnet and protecting member having portions which interlock with each other, said protecting member having an edge which extends around over the proximate edges of the bonnet at the corner.

2. In combination with a bonnet of an automobile having a hole therein, a pad composed of cushioning material and having heads on opposite sides of the bonnet, said pad being located in the hole in the bonnet and having edges projecting beyond the edges of the bonnet.

3. In combination with a bonnet of an automobile having a hole therein near its corner, a pad inserted in said hole, said cushioning member having on one side a head and on the opposite side a head extending beyond and around the proximate edges of the bonnet at the corner.

4. In combination with a bonnet of an automobile having a hole therein and a pad inserted in said hole, said pad being of circular shape having a head on each side and a neck connecting said heads, said heads extending beyond and around the proximate edges of the bonnet at the corner.

In testimony whereof I affix my signature.

JOHN A. GURKE.